United States Patent
Martins et al.

(10) Patent No.: US 12,393,194 B2
(45) Date of Patent: Aug. 19, 2025

(54) MANAGING CONFLICTING INTERACTIONS BETWEEN A MOVABLE DEVICE AND POTENTIAL OBSTACLES

(71) Applicant: Telefonaktiebolaget LM Ericsson (publ), Stockholm (SE)

(72) Inventors: Jean Paulo Martins, Indaiatuba (BR); Alberto Hata, Campinas SP (BR); Klaus Raizer, Indaiatuba (BR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 375 days.

(21) Appl. No.: 17/774,049

(22) PCT Filed: Nov. 5, 2019

(86) PCT No.: PCT/EP2019/080298
§ 371 (c)(1),
(2) Date: May 3, 2022

(87) PCT Pub. No.: WO2021/089131
PCT Pub. Date: May 14, 2021

(65) Prior Publication Data
US 2022/0382286 A1    Dec. 1, 2022

(51) Int. Cl.
*G05D 1/02*   (2020.01)
*B25J 9/16*   (2006.01)
*G05D 1/00*   (2006.01)

(52) U.S. Cl.
CPC .......... *G05D 1/0214* (2013.01); *B25J 9/1666* (2013.01); *G05D 1/0274* (2013.01)

(58) Field of Classification Search
CPC ... G05D 1/0214; G05D 1/0274; B25J 9/1666; G05B 2219/40455
(Continued)

(56) References Cited

U.S. PATENT DOCUMENTS

2004/0024528 A1\* 2/2004 Patera .................. G08G 5/80
                                                340/961
2010/0052973 A1\* 3/2010 Fabre .................. G08G 5/51
                                                342/30
(Continued)

FOREIGN PATENT DOCUMENTS

EP       2952993 A1     9/2015

OTHER PUBLICATIONS

International Search Report and Written Opinion dated Jul. 10, 2020 for International Application No. PCT/EP2019/080298 filed Nov. 5, 2019, consisting of 14 pages.
(Continued)

*Primary Examiner* — Adam D Tissot
(74) *Attorney, Agent, or Firm* — Weisberg I.P. Law, P.A.

(57) ABSTRACT

In one aspect, a method of determining a risk of conflict between a movable device and potential obstacles is provided. The method includes dividing a space into a plurality of positions. At each of a plurality of successive times, the method further includes: determining a conflict function for the movable device in a first position at a respective time, the first position having one or more neighbouring positions, wherein the conflict function is determined based on whether or not an obstacle is present in any of the first position and the one or more neighbouring positions; and determining a respective risk value for at least one of the first position and the one or more neighbouring positions using the conflict function and a risk value associated with a second position, wherein the movable device is planned to move from the first position to the second position at a subsequent time.

13 Claims, 6 Drawing Sheets

(58) Field of Classification Search
USPC .......................................................... 701/23
See application file for complete search history.

(56) References Cited

U.S. PATENT DOCUMENTS

| | | | |
|---|---|---|---|
| 2012/0158178 A1* | 6/2012 | Hyung ................ | G05D 1/0274 |
| | | | 901/46 |
| 2017/0089710 A1* | 3/2017 | Slusar .................... | G06V 20/58 |
| 2017/0241791 A1* | 8/2017 | Madigan ................ | G06Q 40/08 |
| 2020/0035106 A1* | 1/2020 | Suzuki ..................... | G08G 3/02 |
| 2022/0276650 A1* | 9/2022 | Inam ........................ | B25J 9/162 |
| 2023/0406461 A1* | 12/2023 | Uoshita .................. | B63B 49/00 |

OTHER PUBLICATIONS

Burgard et al. Introduction to Mobile Robotics; Robot Motion Planning; UNI FREIBURG; Jul. 2011, consisting of 151 pages.
Villani et al. "Survey on human-robot collaboration in industrial settings: Safetly, intuitive interfaces and applications"; ScienceDirect; Mechatronics; Feb. 2018, consisting of 19 pages.
Hosseini et al. "Classification of facility layout problems: a review study"; CrossMark Int J Adv Manuf Technol; Springer-Verlag London Ltd., 2017, consisting of 21 pages.
Sutton et al. "Reinforcement Learning An Introduction" Second Edition; The MIT Press; Cambridge, Massachusetts, 2018, pp. 119-123, consisting of 5 pages.
"Executive Summary World Robotics 2018 Industrial Robots"; 2018, pp. 13-22, consisting of 10 pages.

* cited by examiner (a)

(b)

MANAGING CONFLICTING INTERACTIONS BETWEEN A MOVABLE DEVICE AND POTENTIAL OBSTACLES

CROSS-REFERENCE TO RELATED APPLICATIONS

This application is a Submission Under 35 U.S.C. § 371 for U.S. National Stage Patent Application of International Application Number: PCT/EP2019/080298, filed Nov. 5, 2019 entitled "MANAGING CONFLICTING INTERACTIONS BETWEEN A MOVABLE DEVICE AND POTENTIAL OBSTACLES," the entirety of which is incorporated herein by reference.

TECHNICAL FIELD

This relates to determining risks of conflict between movable devices and potential obstacles.

BACKGROUND

As described in "Executive Summary World 2018 Industrial Robots" issued by the International Federation of Robotics, sales of robots continue to increase across a range of industries. Automated devices (e.g. robots) are increasingly being used alongside humans to combine the advantages of automation with the skills of human workers ("Survey on human-robot collaboration in industrial settings: Safety, intuitive interfaces and applications", Villani et al, *Mechatronics*, vol. 55, pp. 248-266, 2018). These devices are often deployed in dynamic environments with varying layouts and configurations. There may be humans and other automated devices moving throughout the environment, creating a risk of collisions or other adverse interactions between any automated devices and humans present. Various safety standards are often implemented to reduce this risk, which may, for example, force a moving device to deviate from its path to avoid a collision with a human. However, such deviations from a device's planned route can increase the time taken for the device to perform its task, thereby decreasing overall efficiency.

SUMMARY

Aspects of the disclosure address these and other problems.

In one aspect, the present disclosure provides a method of determining a risk of conflict between a movable device and potential obstacles. The method comprises dividing a space into a plurality of positions and, at each of a plurality of successive times, determining a conflict function for the movable device in a first position at a respective time, wherein the movable device is planned to move from the first position to the second position at a subsequent time. The first position has one or more neighbouring positions, and the conflict function is determined based on whether or not an obstacle is present in any of the first position and the one or more neighbouring positions. The method further comprises, at each of the plurality of successive times, determining a respective risk value for at least one of the first position and the one or more neighbouring positions using the conflict function and a risk value associated with the second position.

Apparatus and machine-readable mediums are also provided for performing the method set out above. For example, in one aspect there is provided an apparatus for determining a risk of conflict between a movable device and potential obstacles. The device comprises processing circuitry and a machine-readable medium storing instructions which, when executed by the processing circuitry, cause the apparatus to divide a space into a plurality of successive positions. At each of a plurality of successive times, the movable device is planned to move from a first position to a second position at a subsequent time, and the apparatus is further caused to determine a conflict function for the movable device in the first position at a respective time. The first position has one or more neighbouring positions, and the conflict function is determined based on whether or not an obstacle is present in any of the first position and the one or more neighbouring positions. The apparatus is further caused to, at each of the plurality of successive times, determine a respective risk value for at least one of the first position and the one or more neighbouring positions using the conflict function and a risk value associated with the second position.

BRIEF DESCRIPTION OF DRAWINGS

For a better understanding of examples of the present disclosure, and to show more clearly how the examples may be carried into effect, reference will now be made, by way of example only, to the following drawings in which.

DETAILED DESCRIPTION

Figure 1:
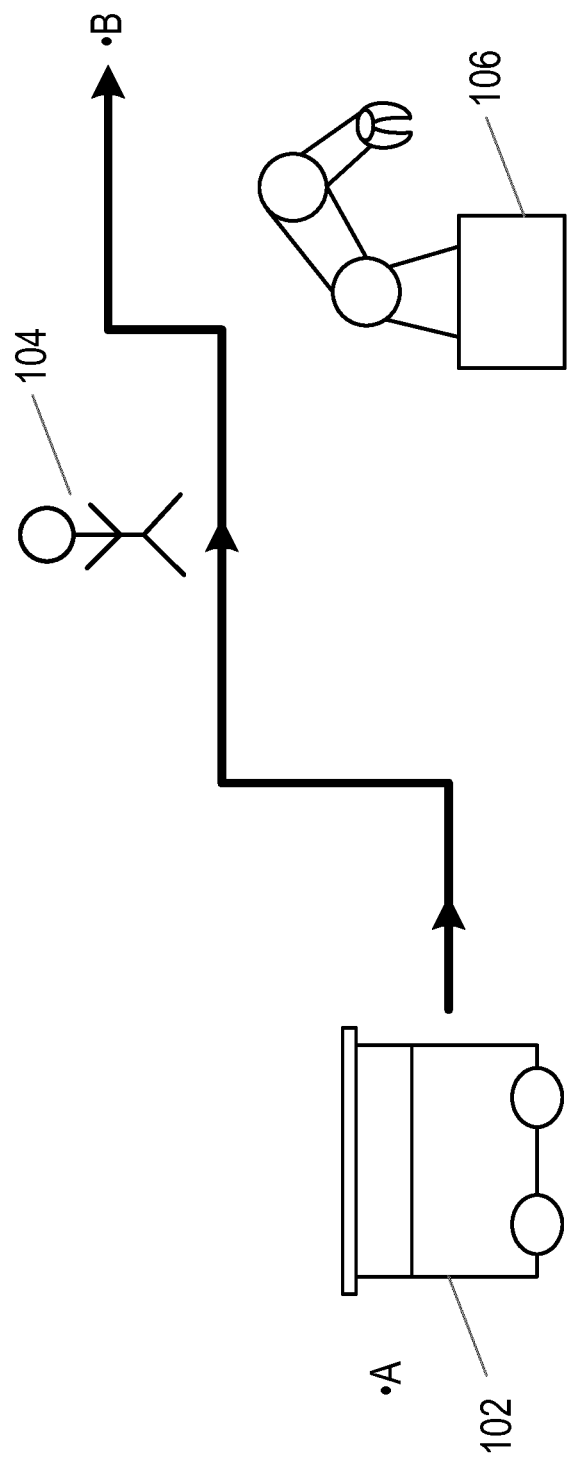
FIG. 1 is schematic illustration of a movable device and obstacles in a space according to embodiments of the disclosure.

FIG. 1 shows an illustration of a movable device 102 and obstacles 104, 106 in a space according to embodiments of the disclosure. Two obstacles 104, 106 are shown, although the skilled person will appreciate that there may be any number of obstacles in the space.

The movable device 102 may be an automated device (e.g. a robot, an autonomous device, an autonomous guided device etc.). That is, the movable device 102 may be capable of performing one or more tasks with minimal or no human intervention. For example, a movable device 102 may be capable of predicting a potential collision with an obstacle and stopping before the collision occurs. The movable device 102 may, additionally or alternatively, be controlled by a human operator. For example, the movable device 102 may be remotely controlled by the human operator to perform one or more tasks. In particular embodiments, the movable device 102 may be capable of performing some tasks without human intervention and other tasks under direct control of an operator. For example, navigation of the movable device 102 around the space may be controlled by a human operator, and the response of the movable device 102 to a detected risk of collision (e.g. stopping, swerving or slowing down) may be automated.

The movable device 102 is initially located in position A in the space and is planned to move to position B in the space. The movable device 102 may, for example, be configured with a predetermined route (e.g. such as the route shown) from position A to position B. In another example, the movable device 102 may be configured to follow one or more route indicators to move from position A to position B. The route indicators may comprise, for example, reflectors positioned in the space (e.g. for use as laser targets), markings (e.g. coloured or magnetic guide tape) or any other suitable indicators. In a further example, the movable device 102 may use a map or layout of the space to determine its own route. In an alternative example, the movable device may be piloted remotely by human operator.

As noted above, the obstacles 104, 106 are also present in the space. In the illustrated embodiment, the obstacles comprise a human 104, who might move around in the space, and another device 106, which might be in a fixed location, however, those skilled in the art will appreciate that the obstacles may be anything potentially affecting movement of the movable device 102. Examples of obstacles thus include other movable devices, static devices, walls, difficult terrain or stairs (e.g. for a movable device configured to travel along a floor) or any other factor affecting movement of the movable device 102.

The movable device 102 may encounter one or more of the obstacles 104, 106 as it moves in the space, which may risk danger or damage to the obstacles 104, 106 and/or the movable device 102. The movable device 102 may be caused to slow down, stop moving or alter its route to avoid obstacles 104, 106, however, this may prevent or delay the movable device 102 from reaching its destination (e.g. position B in FIG. 1) and/or performing any tasks it is planned to perform. In addition, any changes to a route of the movable device 102 may, for example, risk the movable device 102 obstructing the movement of other devices in the space, which may not be aware of any detour taken by the movable device 102.

According to embodiments of the disclosure, a method for determining a risk of conflict between the movable device 102 and any potential obstacles is provided. At each of a plurality of successive times, the movable device is planned to move from a first position (i.e. its current position) to a second position (i.e. a subsequent position along the route), and a risk value for at least one of the first position and one more positions neighbouring the first position (i.e. one or more neighbouring positions) is determined. The risk value is determined using a risk value of the second position and a conflict function, in which the conflict function is based on whether or not an obstacle is present in any of the first position and the neighbouring positions.

By determining risk values based on whether or not obstacles are detected near to the movable device as it moves in the space, embodiments of the disclosure advantageously provide a method for iteratively learning and adapting risk levels as the movable device moves around a space. By further determining risk values based on risks associated with subsequent positions of the movable device, the planned behaviour of the movable device is taken into account, which enables determining more accurate and representative risk values.

Figure 2:
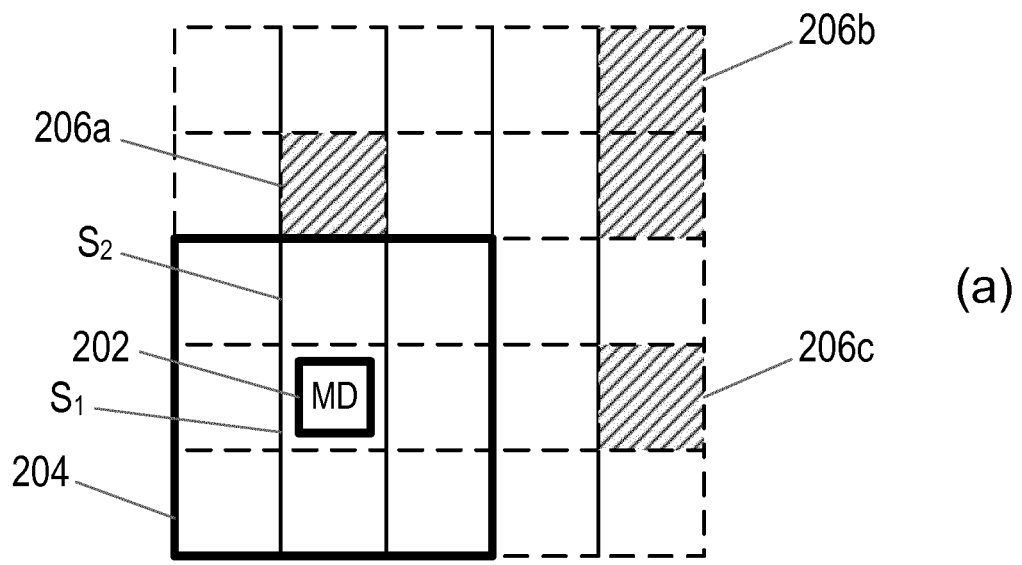
FIG. 2 shows a schematic illustration of a movable device in a first position and a schematic illustration of the movable device in a second position.
Figure 2:
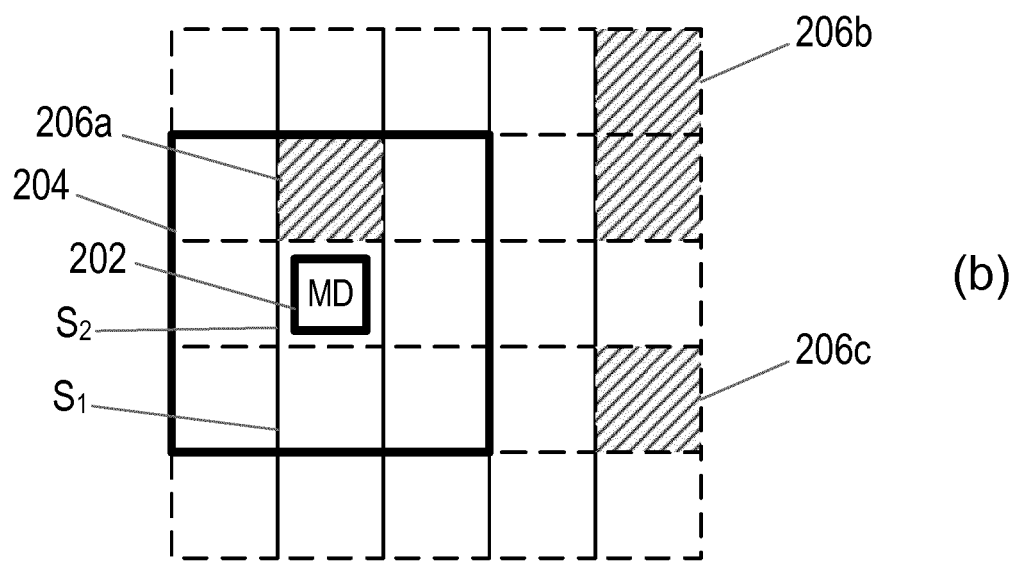

FIG. 2 shows a movable device 202 planned to move from a first position $s_1$ as shown in (a) to a second position $s_2$ as shown in (b), according to embodiments of the disclosure.

The space in which the first and second positions $s_1$, $s_2$ are located is divided into a plurality of positions. The positions in FIG. 2 are represented in two-dimensions, however, the skilled person will appreciate that in general the plurality of positions may be represented in one-, two- or three-dimensions. In the illustrated embodiment, the space is divided into a plurality of tessellating finite elements (e.g. cells), however any appropriate representation of the positions may be used. In embodiments in which the positions are represented as finite elements, the finite elements may be any suitable size and/or shape. The finite elements may be one-, two- or three-dimensional. For example, two-dimensional positions may be represented as finite elements that are quadrilateral (e.g. square), hexagonal, triangular or any other suitable two-dimensional shape. In other examples, three-dimensional positions may be represented as cubes, cuboids, tetrahedrons or any other suitable three-dimensional shape. The finite elements may be identical in size and/or shape, or the size and/or shape of the finite elements may vary.

Each of the first position $s_1$ and the second position $s_2$ have one or more respective neighbouring positions 204. In the illustrated embodiment, the neighbouring positions 204 of the first and second positions consist of the cells adjacent to the first and second positions respectively. However, the skilled person will appreciate that the neighbouring positions may comprise more or fewer positions. For example, the neighbouring positions for a given position may comprise all of the positions (e.g. cells) within a predetermined distance of the given position. In another example, the neighbouring positions may comprise any positions that the movable device 202 is capable of moving to within a predetermined amount of time.

As illustrated, there are a number of obstacles 206a, 206b, 206c (collectively, 206) located in the space. The movable device 202 may not be able to move through any positions occupied by an obstacle 206. The obstacles 206 may be of varying sizes, and thus may, for example, occupy a single position in the plurality of positions (as for obstacles 206a, 206c) or multiple positions (as for obstacle 206b) according to their size. For example, a human may be considered to occupy a single position, whereas a large piece of machinery may occupy multiple positions.

As discussed in more detail below, risk values may be determined for positions in the space using reinforcement learning. In particular examples, temporal difference learning may be used to determine the risk values, in which risk values for positions in the space are successively updated based on existing risk values for the positions in the space. In this way, a risk map for the space may be iteratively updated as the movable device 202 moves through the space.

The updated risk values for the first position, $s_1$, i.e. the current position of the movable device 202, and for the one or more neighbouring positions of the first position, $N(s_1)$ 204 at a respective time, t, are determined based on a conflict function, and a current risk value for the second position $s_2$, i.e. the planned next position of the movable device 202. The conflict function, $C_t(s_1)$, is determined based on whether or not an obstacle is present in any of the first position $s_1$ and the one or more neighbouring positions, $N_t(s_1)$ 204.

An example of a conflict function for a position, s, at a time, t, is:

$$C_t(s) = \begin{cases} 1, & \text{if an obstacle is present} \\ -1, & \text{otherwise,} \end{cases} \quad (1)$$

such that the conflict function for the position, s, returns a value of 1 if an obstacle is present in the position s or any of its neighbouring positions, $N_t(s)$, and returns a value of −1 if there are not any obstacles present.

As applied to the embodiment shown in FIG. 2, this example conflict function for the movable device 202 in the first position $s_1$ (shown in (a)) returns $C_t(s_1)=-1$, as there are no obstacles in any of the first position $s_1$ and the neighbouring positions $N(s_1)$ 204.

A change in the risk value for each of the positions s' of the first position, $s_1$, and the neighbouring positions, $N(s_1)$, (i.e. $s' \in \{s_1 \cup N_t(s_1)\}$) may be determined using a temporal difference $\delta_t(s')$, where:

$$\delta_t(s')=C_t(s_1)+\gamma R_t(s_2)-R_t(s_1), \quad (2)$$

in which $R_t(s_2)$ is a current risk value of the second position $s_2$ and $R_t(s_1)$ is a current risk value of the first position $s_1$. $\gamma$ is a discount factor that determines the impact of the risk value of the subsequent position (i.e. the second position) on the change in the risk value for the first position and its neighbouring positions. In some embodiments, $0 \leq \gamma \leq 1$.

The risk value for each of the first position and the neighbouring positions may then be determined from $$R_{t+1}(s')=R_t(s')+\alpha \delta_t(s'), \quad (3)$$

in which $\alpha$ is a learning parameter, which determines how quickly the risk values are updated. In some embodiments, $0 \leq \alpha \leq 1$.

The risk values for each of the first position and the neighbouring positions may be determined such that the risk values are not below a minimum value. For example, the risk value for each of the first position and the neighbouring positions may be determined using:

$$R_{t+1}(s')=\max\{0, R_t(s')+\alpha \delta_t(s')\}, \quad (4)$$

such that the risk values do not decrease below zero.

Respective risk values for at least one of the first position and the one or more neighbouring positions of the first position may thus be determined. The movable device may then, for example, move to the second position as illustrated in (b). Respective risk values for each of the second position and the one or more neighbouring positions 204 of the second position may be determined according to the calculations outlined above in respect of the first position. This may then be repeated as the movable device moves through subsequent positions in the space to develop a map of risk values for the space.

Figure 3:
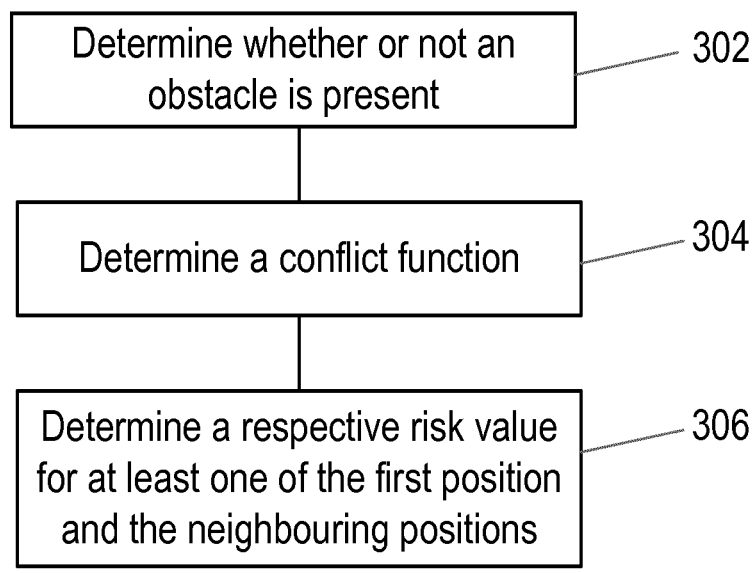
FIG. 3 is a flowchart of a method according to embodiments of the disclosure.

FIG. 3 is a flowchart of a method for determining a risk of conflict between a movable device and potential obstacles according to embodiments of the disclosure. The movable device may be, for example, the movable device 102 illustrated in FIG. 1 or the movable device 202 illustrated in FIG. 2. The method may be performed by the movable device 202 itself or, for example, the method may be performed by another device (e.g. a coordinating device or node). In particular embodiments, implementation of the method may be distributed across multiple devices. For example, parts of the method may be implemented in the movable device 202, and any remaining parts of the method may be implemented in a coordinating device that is in communication with the movable device 202.

The method comprises dividing a space in which the movable device 202 is located into a plurality of positions. As described above in respect of FIG. 2, the space may be divided into a plurality of finite elements. The finite elements may tessellate to form a mesh or grid. The positions may be represented using one-, two- or three-dimensional coordinates. The dimensions may depend on the properties of the movable device 202. For example, a three-dimensional mesh may be used to represent the plurality of positions if the movable device is capable of flight (i.e. for aerial movable devices). In other examples (e.g. for movable devices not capable of flight), two-dimensional coordinates may be sufficient.

Each position in the plurality of positions may be associated with a respective risk value. The method may comprise initialising one or more of the respective risk values to an initial value (e.g. zero). The respective initial risk values of one or more of the positions may depend on information already known about the associated position. For example, risk values for positions in which obstacles are known or expected to be located may be initialised to higher values than positions that are known or expected to be free of obstacles.

The movable device 202 is located in an initial position in the space. The movable device 202 may then move, at one or more of a plurality of successive times, through the space. The movable device 202 may move in accordance with a predetermined route (e.g. the movable device 202 may be configured with the predetermined route or it may receive instructions from another device configured with the route). Alternatively, the route of the movable device may be determined as it travels (e.g. based on a map or layout of the space).

The subsequent steps of the method described below in respect of FIG. 3 are performed at each of the plurality of successive times (e.g. as the moveable device moves through the space). At each of the plurality of successive times, the moveable device is located in a first position in the space and is planned to move to a second position in the space (e.g. along a route as described above).

In step 302, the method comprises determining whether or not an obstacle is present in any of a first position of the moveable device 202 and one or more neighbouring positions of the first position. As described above in respect of FIG. 2, the neighbouring positions may, for example, consist of positions (e.g. cells) adjacent to the first position, positions within a particular distance of the first position or positions that the movable device 202 is capable of moving to within a predetermined amount of time.

In particular embodiments, the movable device 202 contains at least one sensor. It may be determined whether or not an obstacle is present based on data obtained from the at least one sensor in the movable device 202. Alternatively, it may be determined whether or not an obstacle is present based on data obtained by at least one sensor that does not form part of the movable device 202 (e.g. a sensor located in the space). In either case, the at least one sensor may comprise any suitable sensor for use in identifying or detecting potential obstacles. For example, the at least one sensor may comprise one or more of the following: a camera, an ultrasound sensor, an infrared sensor, a microphone, a radar sensor, a lidar sensor etc.

In a further alternative, it may be determined whether or not an obstacle is present based on receipt of an indicator. For example, an indicator indicating whether or not an obstacle is present in any of the first position and the one or more neighbouring positions may be received, for example, from the moveable device 202 or from at least one sensor in the space.

The method progresses to step 304, in which a conflict function for the movable device 202 in the first position at a respective time is determined. The conflict function is determined based on whether or not an obstacle is present in any of the first position and the one or more neighbouring positions. The conflict function may be determined using, for example, Equation (1) described above in respect of FIG. 2. However, the skilled person will appreciate that the conflict function may be any suitable function that depends on whether or not an obstacle is present in any of the first position and the one or more neighbouring positions.

The conflict function may additionally depend on one or more of the following factors.

The conflict function may depend on a distance between the first position and an obstacle. For example, the conflict function may return a larger value if any obstacle is detected within a predetermined distance from the first position, than if the only detected obstacle detected is further away. In particular examples, the conflict function may be inversely proportional to the distance to the obstacle.

The conflict function may depend on the number of obstacles in any of the first position and the one or more neighbouring positions 204. Thus, for example, the conflict function may be larger if a neighbouring position is occupied by multiple obstacles, than if the neighbouring position is occupied by a single obstacle.

The conflict function may depend on the proportion or number of the first position and neighbouring positions that are occupied by an obstacle. Thus, for example, the conflict function may be larger if each of the neighbouring positions are occupied by an obstacle, than if only one of the neighbouring positions is occupied by an obstacle.

The conflict function may depend on a type of the obstacle. For example, the conflict function may return a higher value if the obstacle is human than if the obstacle is not human (e.g. if the detected obstacle is another movable device).

The conflict function may depend on a velocity of the obstacle. In one example, the conflict function may return a different value (e.g. a higher value) for moving obstacles than for static obstacles. In another example, fast-moving obstacles may be associated with a higher risk. The conflict function may thus return a higher value when an obstacle with a higher velocity is present than if only an obstacle with a lower velocity is present.

The conflict function may depend on a size of the detected obstacle. For example, the conflict function may return larger values for larger obstacles than for smaller obstacles.

The method progresses to step 306, in which a respective risk value for at least one of the first position and the neighbouring positions is determined. As described above in respect of FIG. 2, a respective risk value may be determined for each of the first position and the neighbouring positions. However, the skilled person will appreciate that the disclosure is not limited as such. For example, respective risk values may be determined for only the neighbouring positions. In another example, respective risk values may be determined for the first position and any neighbouring positions that are adjacent to the first position.

The respective risk value for at least one of the first position and the neighbouring positions is determined based on the conflict function and a risk value of a second position, in which the movable device 202 is planned to move from the first position to the second position. The respective risk value may, for example, be determined using the method outlined above in respect of FIG. 2.

The respective risk value of the second position may have been determined using an earlier iteration of the present method. Alternatively, the respective risk value of the second position may have been initialised to a pre-determined value.

In particular embodiments, the respective risk value for at least one of the first position and the neighbouring positions may be further based on a current or existing risk value for each respective position. For example, the respective risk value for the first position may be further based on an existing risk value for the first position. Thus, the risk value for each respective position may be iteratively updated taking into account a previously determined risk value for that respective position.

In alternative embodiments, the respective risk value for at least one of the first position and the neighbouring positions may be further based on a current or existing risk value for the first position only. For example, the respective risk values for each of the neighbouring positions may be further based on an existing risk value for the first position. Similarly, the respective risk value for the first position may be further based on an existing risk value for the first position. In particular examples, the respective risk value for at least one of the first position and the neighbouring positions may be determined using Equations (2) and (3) described above in respect of FIG. 2.

As described above in respect of FIG. 2, the risk values for at least one of the first position and neighbouring positions may be bounded by a minimum value. For example, the risk values may be prevented from decreasing below zero.

Thus, in step 306, a risk value for at least one of the first position and the neighbouring positions 204 is determined using a conflict function and a risk value associated with a second position.

As described above, the steps 302-306, as well as any intermediate steps, may be performed at successive times as the movable device 202 moves through the space. Embodiments of the disclosure thus allow for iteratively learning and adapting risk levels as the movable device 202 moves, thereby allowing for determining and maintaining a risk map of the space.

Those skilled in the art will appreciate that such a risk map may have any number of uses. For example, advantageously, the risk map may be displayed to humans that are intending to work in the space so that they can adapt their plans to avoid or minimise any time spent in high risk areas.

In particular embodiments, the determined risk values (e.g. the risk map) may be used advantageously to monitor the performance, or predicted performance, of the movable device 202. There may be a route or plan, $\pi$, for the movable device 202. The cost, in terms of risk, of following the route (i.e. the combined risk value for the route) depends on the current risk values for positions, $s_i$, along the route, $\pi$. The skilled person will appreciate that there are many ways of calculating a combined risk value for a route, $l_r$ from the risk values for positions along the route. For example, the combined risk value for a route may be given the total, or sum, of risk values for each of the positions along the route, i.e.

$$l_t(\pi) = \sum_i R_t(\pi(s_i)).$$

Alternatively, the combined risk value for the route, $l_r$, may be given by the maximum risk value for the route, i.e.

$$l_t(\pi) = \max R_t(\pi(s_i)).$$

As the movable device 202 travels through the space, the risk values associated with positions in the space may be updated, and thus the combined risk associated with a particular route may change over time. In particular, by updating the risk values in accordance with the methods described herein, the risk values associated with the route may advantageously adapt to changes in the environment (e.g. changes to layout or movement of humans or other devices).

As noted above, movable devices may be configured to stop, slow down or change their route if they encounter an obstacle. Accordingly, an increase in risk for a route may indicate an increased likelihood that the movable device 202 may deviate from its route or perform an unplanned stop. These deviations from the movable device's planned behaviour may lead to an overall decrease in performance. The combined risk associated with a route of the movable device 202 may be therefore advantageously monitored in order monitor the performance of the movable device 202.

The combined risk value of a route of the movable device 202 may be used advantageously to determine whether the movable device 202 should change its planned route. For example, it may be determined that the planned route of the movable device 202 is to be changed if the combined risk value exceeds a maximum risk threshold. The movable device 202 may change its own route, or another device (e.g. a coordinating device) may change the route of the movable device 202.

The combined risk values associated with one or more candidate routes for the movable device 202 may be used to determine a preferred route for the movable device 202. The movable device 202 may then be planned (e.g. configured) to move along the preferred route. For example, the candidate route with the smallest combined risk value may be selected as the preferred route for the movable device 202.

The selection of the preferred route may be further based on respective lengths for the one or more candidate routes. Thus, for example, the preferred route may be the candidate route with an acceptable combined risk value (e.g. a combined risk value within a predetermined range of acceptable risk values) that has the shortest length. In an alternative example, the preferred route may be the candidate route with an acceptable length (e.g. within a predetermined range of length) that has the smallest combined risk value.

Although the aforementioned embodiments have been described in respect of a single movable device 202, the skilled person will appreciate that there may be a plurality of movable devices in the space. The steps outlined above may be performed in respect of each moveable device to determine respective risk values for each of the moveable devices. These respective risk values may be combined to obtain combined risk values for the space. That is, local risk values may be determined for multiple movable devices in the space, and the local risk values may be combined to determine a global (i.e. combined) risk map for the space. The respective (local) risk values may, for example, be determined at each of the moveable devices and then combined at one of the moveable devices. In an alternative example, the local risk values may be combined at another device (e.g. a coordinating device) to form the combined risk map.

The combined risk map may be formed from the respective risk values by, for example, taking the maximum risk value at each position. Alternatively, the combined risk map may be formed from the respective risk values by, for example, taking the maximum or average (e.g. mean, median, mode) risk value at each position. The skilled person will appreciate that there are many ways in which the respective risk values may be combined, and the present disclosure is not limited as such.

The combined risk map may transmitted to each of the plurality of movable devices. The movable devices may continue to update their local copies of the combined risk map using the steps described above in respect of FIG. 3.

By combining respective risk values from multiple devices, embodiments of the disclosure allow for more accurately mapping risks of conflict between movable devices and obstacles in a space.

Figure 4:
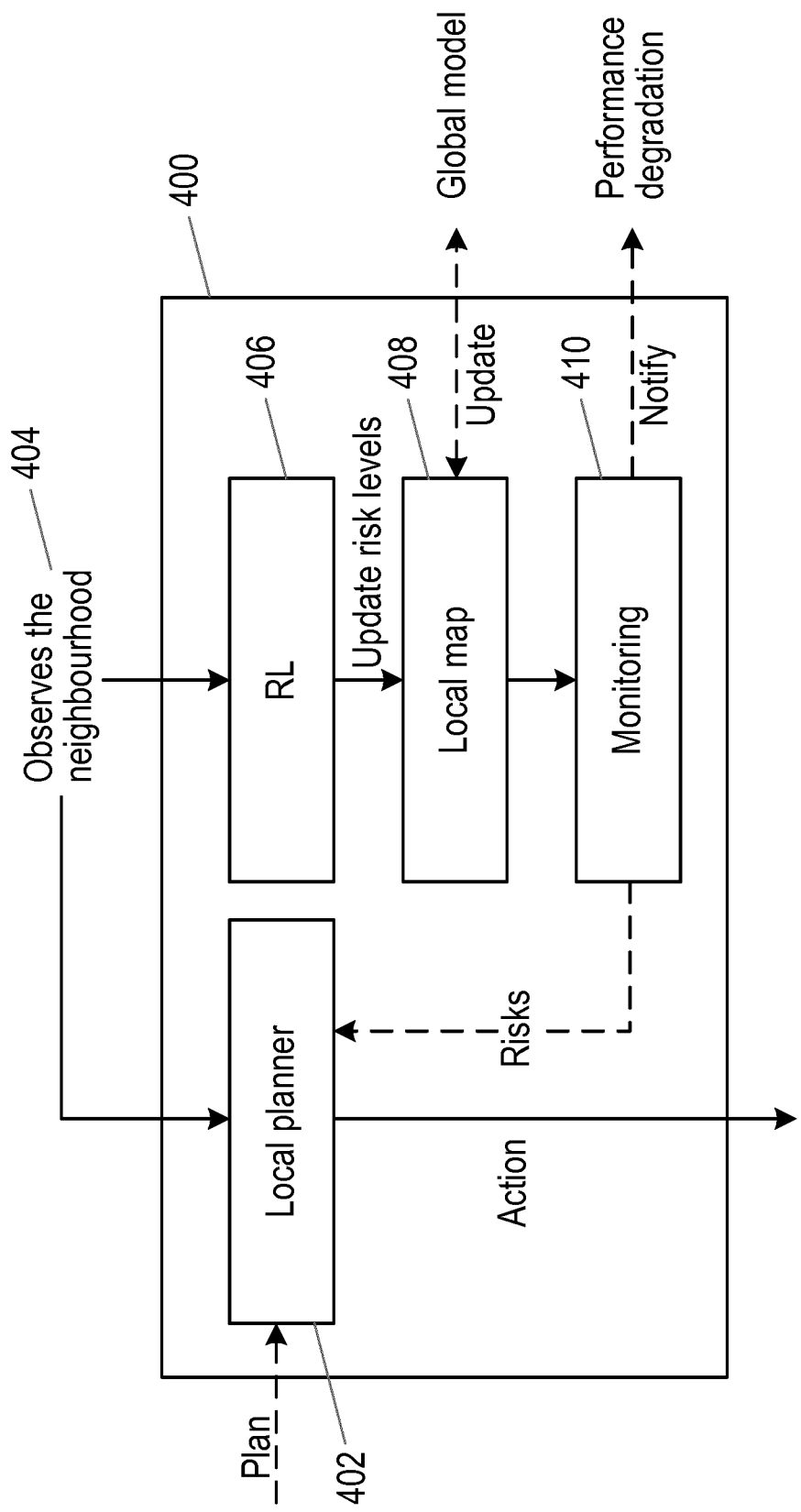
FIG. 4 is a schematic illustration of movable device according to embodiments of the disclosure.

FIG. 4 is an illustration of a movable device 400 according to embodiments of the disclosure. The movable device 400 is adapted to determine a risk of conflict between itself and any obstacles in a space in which it is located. The movable device 400 comprises a planning unit 402, a reinforcement learning (RL) unit 406, a mapping unit 408, and a monitoring unit 410.

Observations 404 of the neighbourhood of the movable device 400 are input to the planning unit 402 and the learning unit 406. When the movable device 400 is in a first position having one or more neighbouring positions, the observations may comprise, for example, an indication of whether or not an obstacle is present in any of the first position and the one or more neighbouring positions. That is, another device (e.g. sensor located in the space) may determine whether or not obstacles are present and inform the movable device 400. Alternatively, the observations may comprise data from at least one sensor in the movable device 400, and the movable device 400 may determine whether or not an obstacle is present in any of the first position and the neighbouring positions based on the sensor data. For example, the movable device 400 may have a camera and may be capable of identifying any obstacles present in images from the camera. In another example, the movable device 400 may be adapted to use lidar to detect any obstacles.

The planning unit 402 determines a subsequent movement for the movable device 400. The planning unit 402 may determine the subsequent movement based on the observations. In a situation with few obstacles, the observations 404 may serve to identify the current location of the movable device 400 and the planning unit may determine the subsequent movement based on the current location and the existing plan. However, as described below, the observations 404 may indicate that the movable device 400 will risk encountering an obstacle if it continues along its current route. The planning unit 402 may thus determine that the movable device 400 will make a detour to avoid the obstacle. The planning unit 402 may be configured with a layout or plan of the space in which the environment is located. The planning unit 402 may use the layout of the space and any observations to determine the subsequent movement of the movable device 400. Alternatively, the planning unit 402 may be configured to receive instructions from another device (e.g. a coordinating device), instructing the movable device 400 where to move.

The learning unit 406 determines a risk value for at least one of the first position and the one or more neighbouring positions. The learning unit 406 may use, for example, any of the methods outlined above in respect of FIG. 1, 2 or 3 to determine the risk value. The learning unit 406 may thus, for example, use observations of the movable device's environment to determine whether or not an obstacle is present and therefore determine the risk values.

The determined risk values are output to a mapping unit 408, which updates a local map of risk values stored at the movable device 400. The local map may comprise a plurality of positions and a plurality of associated risk values. The plurality of positions may use any of the representations described above in respect of FIG. 2, for example.

The mapping unit 408 may, optionally, transmit the local map and/or updates to the risk values to another device (e.g. a coordinating device). Similarly, the mapping unit 408 may be configured to receive updates to the local map from another device. The mapping unit 408 may thus facilitate sending local risk values to another device to form part of a combined (or global) risk map. The mapping unit 408 may, for example, transmit the local risk values (or the updates to the local risk values) at predetermined intervals, on request or whenever there is a significant change in a risk value (e.g. if a risk value changes by more than predetermined amount).

The monitoring unit 410 receives the local map from the mapping unit 408. The monitoring unit 410 identifies potential risks in the local map. For example, the mapping unit 408 may identify any risk value above a predetermined threshold as a significant risk.

The monitoring unit 410 may additionally use the local map to monitor the performance of the movable device 400. The monitoring unit 410 may, for example, calculate the combined risk associated with a route of the movable device 400 (e.g. in accordance with the methods described above in respect of FIG. 3). The monitoring unit 410 may additionally monitor for any significant changes (e.g. values that have changed by more than a predetermined value) in a combined risk value associated with the movable device's route.

The mapping unit 408 may then, for example, notify the planning unit 402 of any potential risks identified and/or any performance issues. For example, the monitoring unit 410 may notify the planning unit 402 of any risk values associated with positions within a predetermined distance of the movable device 400. Thus, the monitoring unit 410 may inform the planning unit 402 of any imminent or immediate risks of conflict to the movable device 400.

The monitoring unit 410 may, additionally or alternatively, transmit a notification to another device (e.g. a coordinating device). For example, the monitoring unit 410 may inform a coordinating device of any significant risks (i.e. risk values above a predetermined value). In another example, the monitoring unit 410 may notify the coordinating device of any risk values in the map that have changed by more than a predetermined value.

Figure 5:
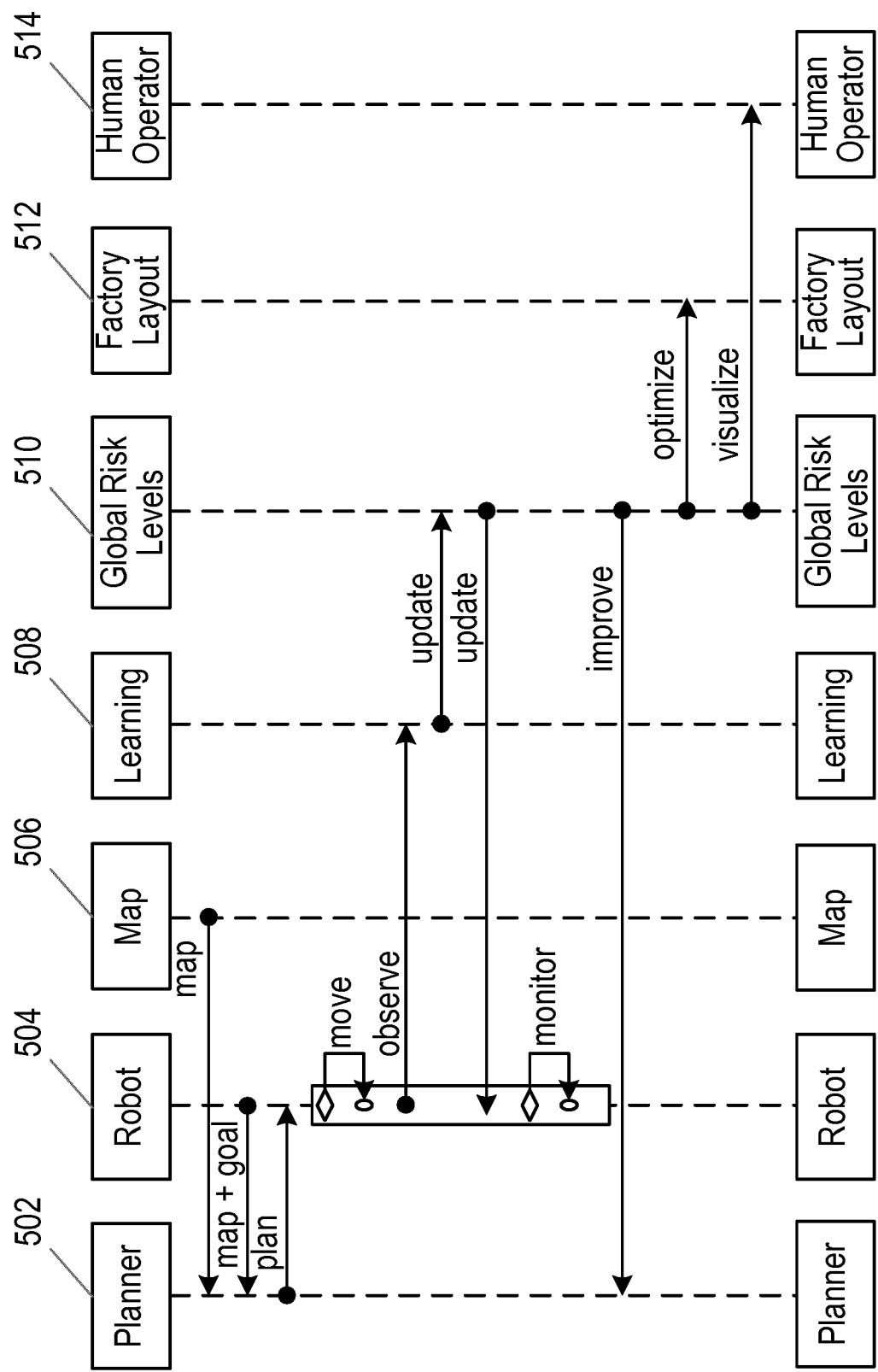
FIG. 5 is a signalling diagram according to embodiments of the disclosure.

FIG. 5 is a signalling diagram according to embodiments of the disclosure. The signalling diagram relates to determining risks of conflict between movable devices and any potential obstacles in the space in which the movable devices are located.

The signalling diagram illustrates communications between a coordinating device 502 and a single movable device 504 in the space. However, those skilled in the art will appreciate that the coordinating device 502 may coordinate (e.g. monitor and/or transmit instructions to) multiple movable devices in the space.

The coordinating device 502 obtains a map 506 indicating a layout of the space. For example, if the movable device 504 is operating in a warehouse, the map may comprise a floorplan of the warehouse (e.g. indicating the positions of any walls, static equipment etc.). The coordinating device 502 also obtains one or more goals or tasks for the movable device 504. Thus, for example, the coordinating device 502 may determine that a task for the movable device 504 is to move to a specific position in the space.

Given the map of the space and one or more goals or tasks for the movable device 504, the coordinating device 502 produces a plan for the moveable device 504. The plan comprises a route for the moveable device 504. The plan may thus, for example, comprise a series of movement instructions for the movable device (e.g. move forward for a particular distance, then stop). The plan may comprise a series of positions for the movable device (e.g. a series of coordinates). The plan may additionally comprise one or more tasks for the movable device to perform (e.g. pick up an object).

The coordinating device 502 transmits the plan to the movable device 504 and the movable device 504 moves according to the plan. As the movable device 504 moves it obtains one or more observations (e.g. as described above in respect of FIG. 4). The observations are used by a learning block 508 to determine whether or not obstacles are present in a vicinity of the movable device 504, and thus to determine one or more risk values for the space. The one or more risk values may be determined using any of the methods outlined above in respect of FIGS. 1-4. In the illustrated embodiment, the one or more risk values are determined at the movable device 504, although the skilled person will appreciate the disclosure is not limited as such. For example, the movable device 504 may alternatively transmit the observations and/or the determination of whether or not an obstacle is present to a risk monitoring device 510. The risk monitoring device 510 may then determine the risk values based on the received information.

In either case, the risk monitoring device 510 obtains determined risk values for the movable device 504. If the risk values are determined at the movable device 504, the movable device 504 may, for example, transmit updated risk values to the risk monitoring device 510 whenever they are determined (e.g. when the movable device moves). Alternatively, the movable device 504 may, for example, transmit updated risk values at predetermined intervals.

The risk monitoring device 510 uses the determined risk values to update a risk map for the space. In particular embodiments, the risk monitoring device 510 obtains respective risk values for multiple movable devices in the space (i.e. the steps described above in respect of FIG. 5 may be performed in respect of the multiple movable devices). The risk monitoring device 510 may combine the respective risk values received from multiple movable devices in the space to form a global (or combined) risk map for the space. The global risk map may be successively improved and refined at the risk monitoring device 510 as updated risk values for each of movable devices are obtained.

The risk monitoring device 510 may transmit the combined risk map to the coordinating device 502. In an alternative example, the risk monitoring device 510 and the coordinating device 502 may be a single device. The coordinating device 502 may use the global risk map to adapt plans for one or more of the movable devices in the space. For example, if the global risk map for the movable device 504 indicates that the movable device 504 is likely to have to perform a detour along its current route (e.g. to avoid an obstacle), then the coordinating device 502 may update the plan for the movable device 504 to prevent the detour from occurring.

The global risk map may be displayed to one or more human operators. The risk monitoring device 510 may thus, for example, comprise a display or screen for showing the global risk map (e.g. as a heatmap). The global risk map may be used by the human operators to prompt changes in a design of the layout 512 of the space and/or the configuration of one or more devices (e.g. the movable devices) in the space. In another example, the global risk map may be used by the human operators 514 to inform their own movements. For example, a high risk region in the global risk map may indicate that human operators should avoid working in or passing through that region.

Aspects of the disclosure thus allow for creating and maintaining a risk map of a space using observations obtained from multiple movable devices as they move through the space.

Figure 6:
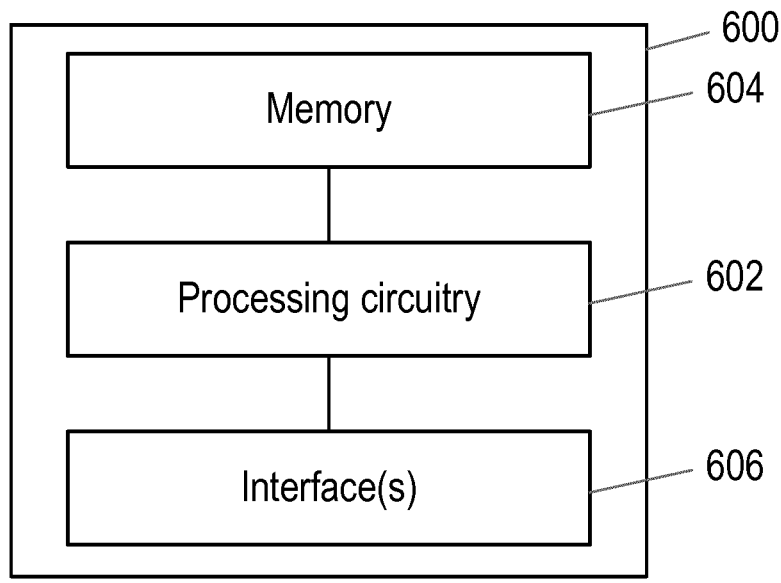
FIGS. 6 and 7 illustrate an apparatus according to embodiments of the disclosure.

FIG. 6 is a schematic diagram of an apparatus 600 for determining a risk of conflict between a movable device and potential obstacles according to embodiments of the disclosure. The apparatus 600 may be adapted to perform the method described above in respect of FIG. 3, for example. The apparatus 600 may be, for example, the movable device (e.g. any of the movable devices 202, 400 and 504 described in respect of FIGS. 2, 4 and 5 respectively) or another device (e.g. the coordinating device 502 or the risk monitoring device 510 described above in respect of FIG. 5).

The apparatus 600 comprises processing circuitry 602 and a machine-readable medium (such as memory) 604. The machine-readable medium stores instructions which, when executed by the processing circuitry 602, cause the apparatus 600 to divide a space into a plurality of positions. The processing circuitry is further caused to, at each of a plurality of successive times: determine a conflict function for the movable device in a first position at a respective time, in which the first position has one or more neighbouring positions, and the conflict function is determined based on whether or not an obstacle is present in any of the first position and the one or more neighbouring positions. The processing circuitry is further caused to determine a respective risk value for at least one of the first position and the one or more neighbouring positions using the conflict function and a risk value associated with a second position, in which the movable device is planned to move from the first position to the second position at a subsequent time.

The apparatus 600 may also comprise one or more interfaces 606, for receiving signals from other nodes of the network and/or transmitting signals to other nodes of the network. The interfaces 606 may use any appropriate communication technology, such as electronic signalling, optical signalling or wireless (radio) signalling.

In the illustrated embodiment, the processing circuitry 602, the machine-readable medium 604 and the interfaces 606 are operatively coupled to each other in series. In other embodiments, these components may be coupled to each other in a different fashion, either directly or indirectly. For example, the components may be coupled to each other via a system bus or other communication line.

Figure 7:
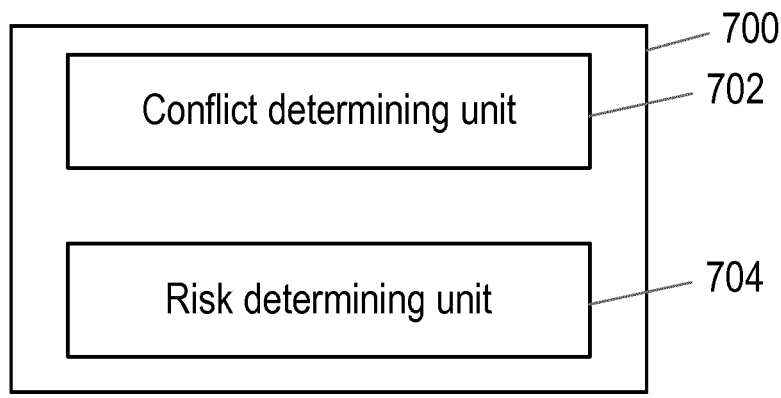

FIG. 7 is a schematic diagram of an apparatus 700 for determining a risk of conflict between a movable device and potential obstacles according to embodiments of the disclosure. The apparatus 700 may be adapted to perform the method described above in respect of FIG. 3, for example. The apparatus 700 may be, for example, the movable device (e.g. any of the movable devices 202, 400 and 504 described in respect of FIGS. 2, 4 and 5 respectively) or another device (e.g. the coordinating device 502 or the risk monitoring device 510 described above in respect of FIG. 5).

The apparatus 700 comprises a conflict determining unit 702. The conflict determining unit 702 is adapted to, at each of a plurality of successive times, determine a conflict function for the movable device in a first position at a respective time, in which the first position has one or more neighbouring positions. The conflict function is determined based on whether or not an obstacle is present in any of the first position and the one or more neighbouring positions.

The apparatus 700 further comprises a risk determining unit 704. The risk determining unit 704 is adapted to, at each of the plurality of successive times, determine a respective risk value for at least one of the first position and the one or more neighbouring positions using the conflict function and a risk value associated with a second position, in which the movable device is planned to move from the first position to the second position at a subsequent time.

The apparatus 700 may also comprise one or more interface modules (not illustrated), for receiving signals from other nodes of the network and/or transmitting signals to other nodes of the network. The interfaces may use any appropriate communication technology, such as electronic signalling, optical signalling or wireless (radio) signalling.

The modules described with respect to FIG. 7 may comprise any combination of hardware and/or software. For example, in an embodiment, the modules are implemented entirely in hardware. As noted above, hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions. In another embodiment, the modules may be implemented entirely in software. In yet further embodiments, the modules may be implemented in combinations of hardware and software.

The present disclosure therefore provides methods, apparatus and machine-readable mediums for determining a risk of conflict between a movable device and potential obstacles. Specifically, the present disclosure enables iteratively learning and adapting risk values as a movable device moves in space, thereby allowing for creating and maintaining a risk map of the space.

It should be noted that the above-mentioned embodiments illustrate rather than limit the concepts disclosed herein, and that those skilled in the art will be able to design many alternative embodiments without departing from the scope of the appended following claims. The word "comprising" does not exclude the presence of elements or steps other than those listed in a statement, "a" or "an" does not exclude a plurality, and a single processor or other unit may fulfil the functions of several units recited in the statements. Any reference signs in the claims shall not be construed so as to limit their scope.

The invention claimed is:

1. A method of determining a risk of conflict between a movable device and potential obstacles, the method comprising dividing a space into a plurality of positions, and, at each of a plurality of successive times:
for each movable device of a plurality of movable devices:
determining a conflict function for the movable device in a first position at a respective time, the first position having one or more neighbouring positions, the conflict function being determined based on whether or not an obstacle is present in any of the first position and the one or more neighbouring positions; and
determining a respective risk value for at least one of the first position and the one or more neighbouring positions using the conflict function and a risk value associated with a second position, the movable device being planned to move from the first position to the second position at a subsequent time, the respective risk value being determined based at least in part on a learning parameter times a change in risk value between a risk value for the first position and the risk value for the second position; and
combining the determined respective risk values to obtain a combined risk map.

2. An apparatus for determining a risk of conflict between a movable device and potential obstacles, the apparatus comprising processing circuitry and a non-transitory machine-readable medium storing instructions which, when executed by the processing circuitry, cause the apparatus to:
- divide a space into a plurality of positions, and, at each of a plurality of successive times:
- for each movable device of a plurality of movable devices:
- determine a conflict function for the movable device in a first position at a respective time, the first position having one or more neighbouring positions, the conflict function being determined based on whether or not an obstacle is present in any of the first position and the one or more neighbouring positions; and
- determine a respective risk value for at least one of the first position and the one or more neighbouring positions using the conflict function and a risk value associated with a second position, the movable device being planned to move from the first position to the second position at a subsequent time, the respective risk value being determined based at least in part on a learning parameter times a change in risk value between a risk value for the first position and the risk value for the second position; and
- combine the determined respective risk values to obtain a combined risk map.

3. The apparatus of claim 2, wherein the respective risk value is further determined using a previous risk value for the at least one of the first position and the one or more neighbouring positions.

4. The apparatus of claim 2, wherein determining a respective risk value for at least one of the first position and the one or more neighbouring positions comprises determining a respective risk value for each of the first position and the one or more neighbouring positions.

5. The apparatus of claim 2, wherein the conflict function depends on one or more of the following:
- a distance between the first position and an obstacle;
- a velocity of the obstacle; and
- a size of the obstacle.

6. The apparatus of claim 2, wherein the apparatus is further caused to, at each of the plurality of successive times:
- determine whether or not an obstacle is present in any of the first position and the one or more neighbouring positions.

7. The apparatus of claim 6, wherein determining whether or not an obstacle is present comprises determining whether or not an obstacle is present based on data obtained from at least one sensor on the movable device.

8. The apparatus of claim 2, wherein the movable device is planned to move along a predetermined route comprising a plurality of successive positions at a respective plurality of the successive times.

9. The apparatus of claim 8, wherein the apparatus is further caused to:
- obtain a combined risk value for the predetermined route from the risk values obtained for each of the plurality of successive positions.

10. The apparatus of claim 9, having a plurality of candidate predetermined routes, wherein the apparatus is further caused to:
- obtain a respective combined risk value for each of the candidate predetermined routes.

11. The apparatus of claim 10, wherein the apparatus is further caused to:
- select a preferred route from the plurality of candidate predetermined routes based on the respective combined risk values.

12. The apparatus of claim 11, wherein each candidate predetermined route has an associated length, and the selection of the preferred route is further based on the lengths of the candidate predetermined routes.

13. The apparatus of claim 2, wherein apparatus is the movable device.

* * * * *